(12) United States Patent
Anders et al.

(10) Patent No.: US 7,564,961 B2
(45) Date of Patent: Jul. 21, 2009

(54) TELEPHONE PORT ALLOCATION METHOD

(75) Inventors: Joseph Anders, Mobile, AL (US); Ken Salter, Mobile, AL (US); Seacol Chin, Mobile, AL (US); Brian Wilson, Mobile, AL (US); Veronica Diaz, Mobile, AL (US); Jay Birch, Mobile, AL (US)

(73) Assignee: **Global Tel*Link Corporation**, Mobile, AL (US)

( * ) Notice: Subject to any disclaimer, the term of this patent is extended or adjusted under 35 U.S.C. 154(b) by 1047 days.

(21) Appl. No.: 10/395,186

(22) Filed: Mar. 21, 2003

(65) Prior Publication Data

US 2003/0179874 A1 Sep. 25, 2003

Related U.S. Application Data

(60) Provisional application No. 60/367,472, filed on Mar. 22, 2002.

(51) Int. Cl.
*H04M 7/00* (2006.01)
(52) U.S. Cl. .................................. 379/220.01; 379/230
(58) Field of Classification Search ............ 379/220.01, 379/230, 229, 242, 88.18
See application file for complete search history.

(56) References Cited

U.S. PATENT DOCUMENTS

| RE34,536 | E  | * | 2/1994  | Frimmel, Jr. ................. 379/88 |
| 5,365,581 | A  | * | 11/1994 | Baker et al. .................. 379/196 |
| 5,793,771 | A  | * | 8/1998  | Darland et al. ............... 370/467 |
| 6,601,115 | B1 | * | 7/2003  | Yonezawa et al. ............. 710/11 |
| 6,967,972 | B1 | * | 11/2005 | Volftsun et al. ............. 370/466 |
| 7,020,159 | B1 | * | 3/2006  | Peshkin et al. ............. 370/466 |
| 7,062,020 | B1 | * | 6/2006  | Pirasteh et al. ........... 379/88.18 |
| 2004/0114610 | A1 | * | 6/2004 | Featherston et al. ......... 370/401 |
| 2005/0141525 | A1 | * | 6/2005 | Rose .......................... 370/401 |

* cited by examiner

*Primary Examiner*—William J Deane
(74) *Attorney, Agent, or Firm*—Dority & Manning, P.A.

(57) ABSTRACT

A method is described for handling multiple telephone and data calls having different data type or business protocols an originating phone, phone being broadly defined as the originating device whether phone or computer, wherein there is an originating phone and a destination phone with or without monitoring phones connected through a network, whether a telephone or data network by establishing a remote network processor having incoming and outgoing ports controlled by the remote network processor which has the steps of generating a plurality of protocols applicable to the incoming and outgoing ports; storing the protocols in a database; selecting a protocol for the incoming and outgoing ports; accepting a call from the originating phone on the incoming port; determining if the call is to be completed; setting parameters for completing the call based on the protocols; and completing the call.

20 Claims, 10 Drawing Sheets

TELEPHONE PORT ALLOCATION METHOD

PRIORITY STATEMENT

This patent is a Continuation in Part of Provisional Patent No. 60/367,472, filed Mar. 22, 2002.

BACKGROUND OF INVENTION

The patent relates to telephone switching systems. More particularly the invention relates to switching systems for handling multiple different simultaneous protocols on non-specialized ports.

More particularly, the invention relates to methods of allocating call ports in accordance with the origin or type of message signal and a method for controlling a message signal once it comes in to a central station, based on information from the originating call signal unit.

PRIOR ART

A client computer or phone initiates a service request. For purposes of phones, this is done by the off hook signal generated by the phone when it is lifted. A server computer waits to reply in the case of a computer accessing a network over the internet a LAN or other WAN (Local or Wide Area Network). This signal can be over wires or over a wireless system.

A server is a processor with a program that knows a protocol for communication, but often doesn't know much about networking. The client and server programs may be on the same computer or on two different computers connected via a network. Once a virtual connection is established between a client and server, the two systems may be peers, but the client/server asymmetry usually continues through the protocol.

Local networks are connected by gateways, which are either general-purpose or dedicated computers that are connected to two or more different LANs (local area networks) or WANs (wide area networks).

Since a computer can have more than one LAN interface, it can have more than one IP address.

When a client computer connects to a server computer, it looks up the server's domain name in a directory through a name server to find the server computer's IP address, and then figures out a route to that address by using routing services on the same system or on other systems, including a gateway.

Once a client computer reaches (connects to) a server over the network, it needs a way to tell the server which service (server program) it wants to talk with. It does this by specifying a port number (at least in TCP/IP). On a server, when each server program starts running, it attaches to one or more port numbers and receives traffic on those ports.

On a client, when a service is needed, the client program looks up the standard port number for the service before connecting to the server system. It is also possible for a human talking with the client system to specify the port number to use for a given connection.

Protocols for the port determine whether the underlying programming can read and understand the incoming message. For example, TCP/IP stands for "transmission control protocol/internet protocol". Along with other protocols, it describes the way that virtual connections are made over networks, including hardware addresses, IP addresses, host names, and the like.

The telephone utilizes a similar mechanism involving a central office which has a switching network connected to individual telephones. This switching network has outgoing ports which are dedicated in limited numbers to each individual phone. This switching fabric may include wireless ports connected to wireless phones. The wire ports are dedicated between the phone or phone bank of the user and the central office of the local phone service provider. The local phone bank has outgoing ports which are connected by switches within the central office to long distance carriers and alternative local calls which have ports within the same central office. For purposes of this discussion, it is not relevant whether the calls actually go to a long distance provider or go to another central office. To determine routing of the call, PCI codes are associated with the wire ports which identify the long distance carrier.

With this information, which may be over-ridden by the first six numbers dialed, the central office routes the call to another central office which then connects the call to another phone bank or phone for the called user. This system has inefficient port control because each called user must satisfy the Erlinger equation.

GENERAL DISCUSSION OF ONE EMBODIMENT OF THE INVENTION

The present system recognizes different types of protocols and identifies the port by (1) accepting the data portion of the call through a wide area network to a remote network processor or by running the data portion (DNIS or ANI) of the phone call through the phone call switching network with each data portion being associated with a given protocol which is received by the remote network processor and compared to several different database collections by a comparison program until the program "recognizes" the protocol and then sets up port according to the identification of the protocol. This requires that a portion of the call is set up using a common protocol, the client maybe forced into the generic protocol.

Server software controls which service talks preferentially over the other and processes the information in the order received.

The invention is a method of allocating calls within a plurality of restricted port capacity systems to maximize efficiencies utilizing the Erlinger capacity paradigms. Where the capacity is limited by the number of ports, methods of sharing ports are essential. In an office environment, this sharing is done with punch down blocks. No comparable economies of scale have been recognizable in traditional long distance service center fabrics.

In order to accomplish these long distance economies of scale in both port usage and equipment maintenance, the present invention provides a novel method of sharing switching ports using hardware and software for controlling the ports through a novel method of changing the personality of the port and associated software.

To do this, the telephone call is broken into several elements, at least some of which are associated with specific protocol and hardware.

The first call portion in the preferred embodiment is the Account number identifier (ANI) which is information identifying the phone unit being used. The ANI may include information which is automatically required (generated or acquired) when the user accesses the phone using a card reader or biological marker identifier such as a finger print reader. The dialed number identifier string (DNIS) or number dialed and ANI together are referred to as the character quantum. The character quantum has information from the call unit (phone for example.) identifying the origin or type of call unit (phone, computer, fax, etc).

A method is described for handling multiple telephone and data calls having different data type or business protocols an originating phone, phone being broadly defined as the originating device whether phone or computer, wherein there is an originating phone and a destination phone with or without monitoring phones connected through a network, whether a telephone or data network by establishing a remote network processor having incoming and outgoing ports controlled by the remote network processor which has the steps of generating a plurality of protocols applicable to the incoming and outgoing ports; storing the protocols in a database; selecting a protocol for the incoming and outgoing ports; accepting a call from the originating phone on the incoming port; determining if the call is to be completed; setting parameters for completing the call based on the protocols; and completing the call.

Since the main focus of the invention is on telephone calls, completing the call is performed by sending completion information through the telephone network and is performed by setting the protocol of the outgoing port and forwarding the call through the outgoing port.

In many cases a monitoring phone is used so that completing the call further comprises the step of forwarding a copy of the call for monitoring to the monitoring. Here the call may be recorded which includes the steps of identifying the recording with certain markers including the start time, origination number, the destination number, a user identifier; compressing the recording, encrypting the recording and providing a security envelope around the recording.

To determine the protocol, where ANI and DNIS data is insufficient, the protocol may be completed by:
i) providing queries
ii) accepting information from queries
iii) providing responses to queries and initiating the responses.

This not only allows for designating the protocol of the port but also provides automated responses to the call. Usually the call includes at least one of ANI data or DNIS data and the step of selecting the protocol comprises the step of determining the type of protocol appropriate based on the ANI or DNIS data in the call. This is done by comparing the database of protocols to a database of originating ANI or DNIS information or a combination of the two. In this way, the call may be viewed as comprised of data and message content and wherein the protocol is determined base on the data portion of the call.

In certain specialized cases, the data portion of the call is sent to the remote network processor and the protocol is selected on the basis of the data portion of the call.

To simplify the process, it is typical to have the telephone record digitized.

Monitoring the call includes content and low level diagnostic information of the system. For the content, the users typically would involve monitoring the call with voice recognition software, identifying the users, the key words or phrases within the recorded call; naming the recording and where appropriate storing the recording. It may also include using the remote network processor or a local computer to determine desirable key words; comparing the call data with the key words; and marking the portions of the call with the key words.

Determining the protocol usually includes identifying the origin, the dialed number, or both and providing a plurality of plurality of protocols comprised of directions and port personalities and rules to determine the type of routing associated with a incoming signal including monitoring, recording, and data push.

In uses where it is appropriate, the step of providing a reading means for obtaining user information and adding the user information with the call through the data or voice portion of the call and setting the protocol based on the user information. The reading means consists of a product from the group of card readers, credit card readers, biological marker readers, finger print readers, optics readers, and pin readers.

For practical purposes it is appropriate to bill by creating a billing record associated with the call and tracking the time and origin and destination to provide for billing to the users.

It is therefore one purpose is to provide a method allowing a shared hardware port to have several different call procedures associated with specific call information (different personalities) so that the shared hardware port may be utilized for a plurality of different call types and different markets.

Another purpose of the invention is to combine network communication techniques with telephone communication architectures in order to increase the port efficiency of a limited number of dedicated telephone ports.

It is another purpose of the invention to provide shared destination port behavior which can be altered according to the origin of the transaction or the specific transaction type with out the other port dedication.

It is another purpose of the invention to provide high efficiency application delivery and to minimize the duplication of hardware for new applications for destination ports.

It is a further objection of the invention to provide for a specific type of character quantum to be generated and to associate a specific hardware and software module based on the user interface device (UID) capturing the port based on a database of port characteristic and utilizing the port with the port character so determined whenever the port goes hot (by the computer or phone going off the hook or incoming calls accessing the port with DNIS or ANI information) triggering the character selection.

It is also a purpose to provide increased flexibility in call servicing centers with associated routing, recording, monitoring, or data push on the same platform utilizing the same ports for different purposes.

These and other objects and advantages of the invention will become better understood hereinafter from a consideration of the specification with reference to the accompanying drawings forming part thereof, and in which like numerals correspond to parts throughout the several views of the invention.

BRIEF DESCRIPTION OF THE DRAWINGS

For a further understanding of the nature and objects of the present invention, reference should be made to the following detailed description taken in conjunction with the accompanying drawings in which like parts are given like reference numerals and wherein.

DETAILED DESCRIPTION OF THE PREFERRED EMBODIMENT

The first broad step of the process, after the initiating phone 150 (for example) is lifted, is to send the call to a centralized long distance port station which is designated the remote network processor 214.

Figure 1:
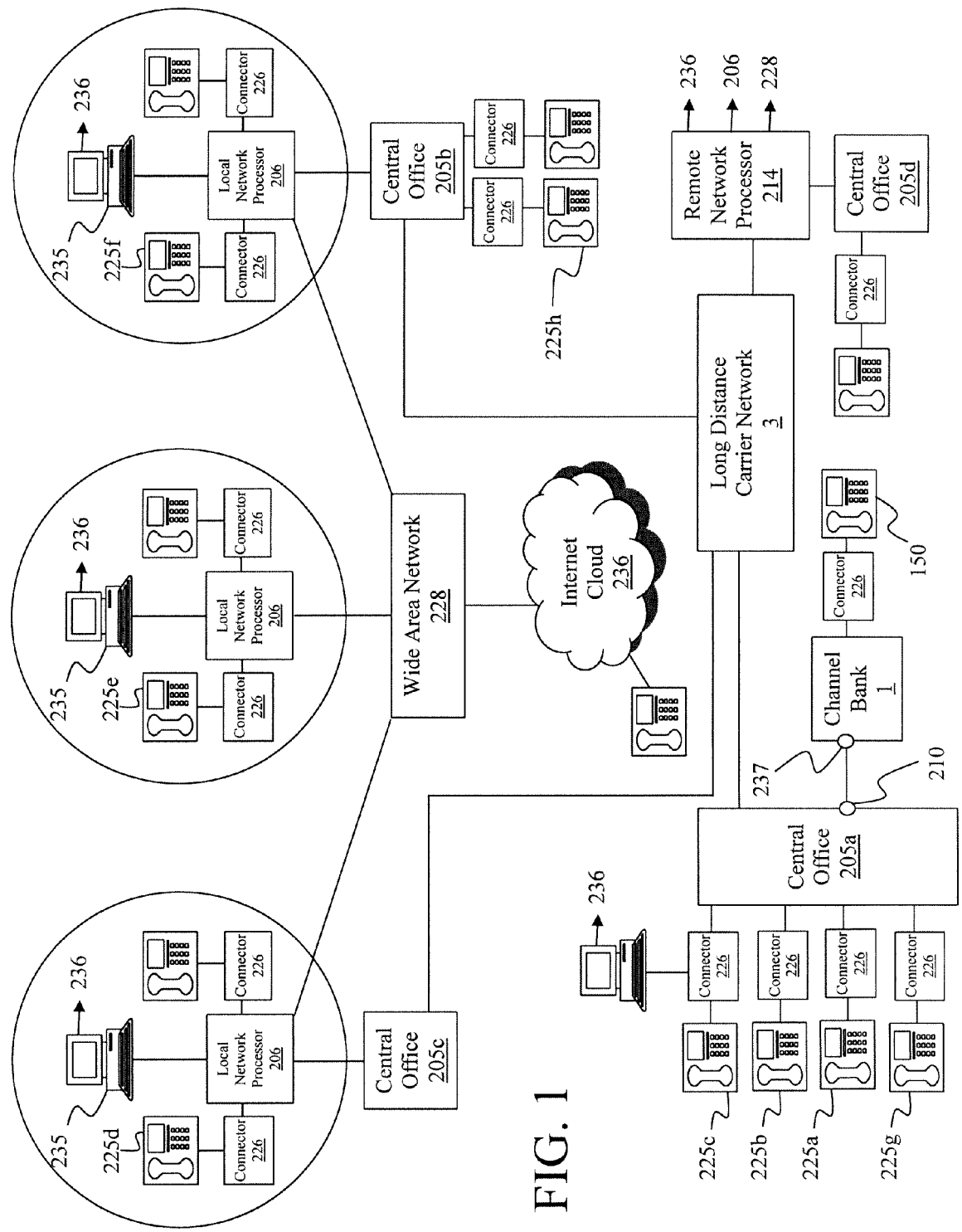
FIG. 1 shows how the switching fabric and remote network processor works in conjunction with multiple users.

As can best be seen by reference to FIG. 1, the call originates from at least one of the phones 150 which passes through a phone bank 1. The process of sending the call is typically done by programming at the central office 205c as described in more detail below.

From this point forward the call is handled by this remote network processor 214 (RNP). This handling process of RNP 214 can be seen in FIG. 9 as described in more detail below.

The steps occur with in or at the direction of the remote network processor 214. In the case of a processing system (CPU) can be seen that this can be handled by having a source telephone 242 going through a picapats card 293 to API line as shown in more detail in FIG. 7.

Figure 4:
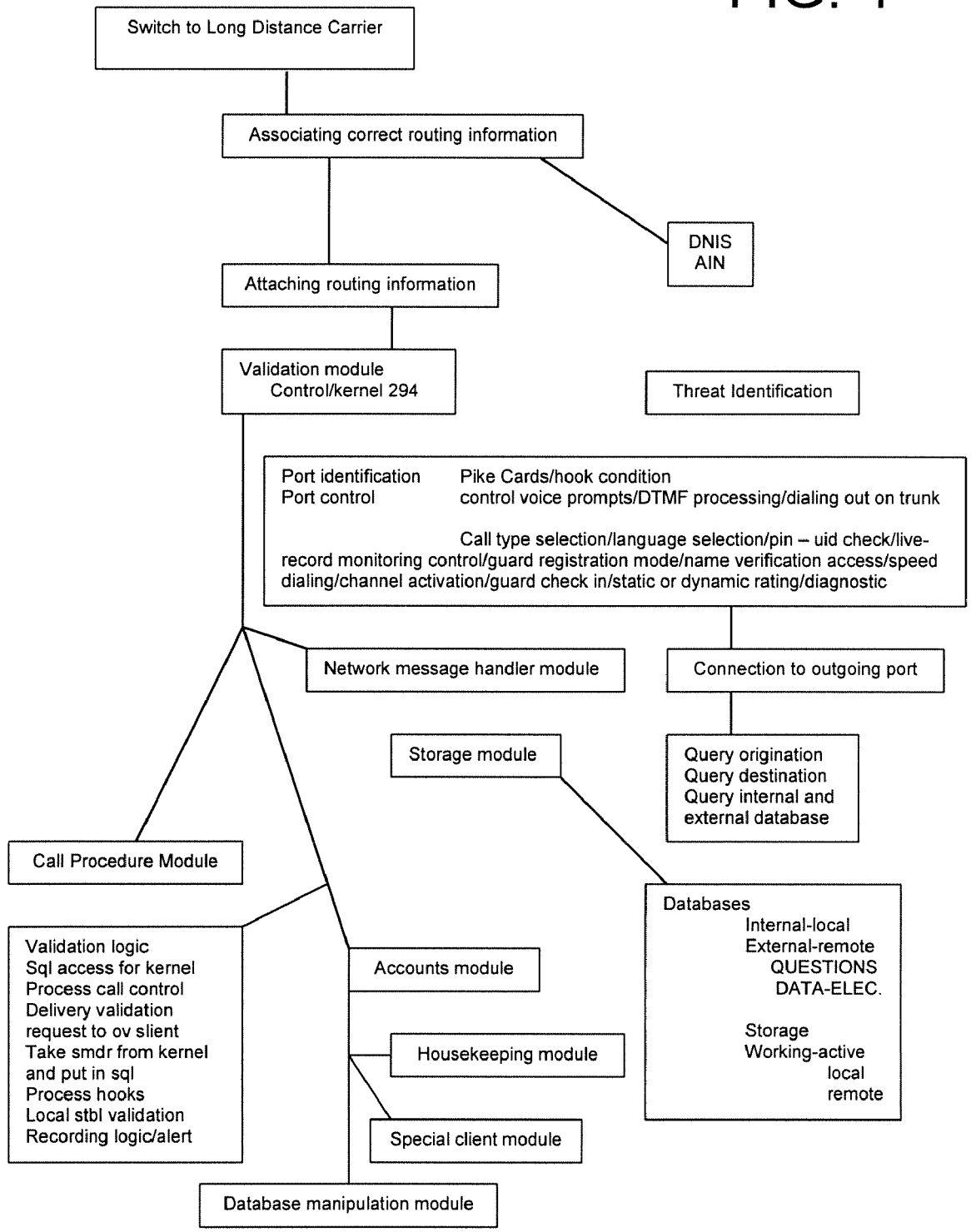
FIG. 4 shows a flow chart of a process for controlling ports in the switching fabric.

At the RNP 214, as shown in FIG. 4 the first kernel module examines the information coming in at the port which controls incoming and outgoing ports 5a and 5b by usually defined by cards 140 (Pica or T1 cards), looks for the hook condition (on/off), controls voice prompts, processes DTMF information, controls dialing out (on a usually high capacity trunk line), selects the type of call, selects the language associated with the type of call, identifies and controls the PIN number, handles or controls live monitoring, security registration mode verifies the PIN to name access, speed dials number or handles speed dialing functions, activates channels, (guard check in, gives a static or dynamic ratings for the line, generates diagnostic reports, creates local CDR files in the event of a SMDR failure. Here a first and a second API line are connected to incoming and outgoing cards which are the incoming 5a and outgoing 5b ports. These outgoing cards take the call outward to the telephone company where it is finally routed to the called party.

The method of allocating phone calls to restricted capacity lines comprising the steps of:
 a. setting up a plurality of initiating telephones;
 b. providing at least one network switching means to connect the initiating telephones to a plurality of incoming ports of a remote network processor; which includes a switch to long distance carrier by associating correct routing information and attaching the routing information.

This is then switched to a receiving port at the remote network processor 214.

The validation module determines at the remote network processor the characteristics associated with calls from the initiating telephones comprised of the steps of:
 i. identifying the origin, the dialed number, or both;
 ii. setting a plurality of rules to determine the type of routing associated with a incoming signal including monitoring, recording;
 iii. providing a plurality of protocols comprised of instructions for handling calls and port settings associated with different types of phone calls;
 e. setting the protocol of an incoming port at the remote network processor;
 f. setting the protocol of at least one outgoing port at the remote network processor;
 g. connecting the incoming ports and the at least one outgoing port; and
 h. connecting the incoming port with the at least one outgoing port.

Port identification and control and threat (software) identification may occur as shown. Language may be selected for the call or default language may be selected.

The controlling software for the port 5 is controlled directly by the call procedure module which contains validation logic, SQL access for the kernel (controlling the port), processes call control, delivers validation request to a client, (database and comparison module) takes SNDL from the kernel and places it in a SQL, processes hooks, local STDL validation, contains recording logic and alert logic in order to notify certain circumstances and may contain threat identification modules (virus scan) and hardware (circuit) breakers.

This call procedure module is connected through the API to the NT registry on the controller which in turn is connected through API to a REG module that speeds up remote access of the registry and writes registry to SQL for call search and can back up the registry to files when required. The NT registry is also connected to the site client which keeps the clock on, controller correct, and also monitors the heart beat of the system (generated by the clock) and sends the status to a monitoring system so that problems with the systems can be determined.

This registry may be connected through a socket in series with the REG module. The site client module so described is contacted through a socketing series with a socket connection and the REG module through the ISP router which is connected through the Internet or another frame (WAN) to the servers.

This communication from the ISP to the servers is controlled by the IAS assistant which maintains the connection.

Figure 10:
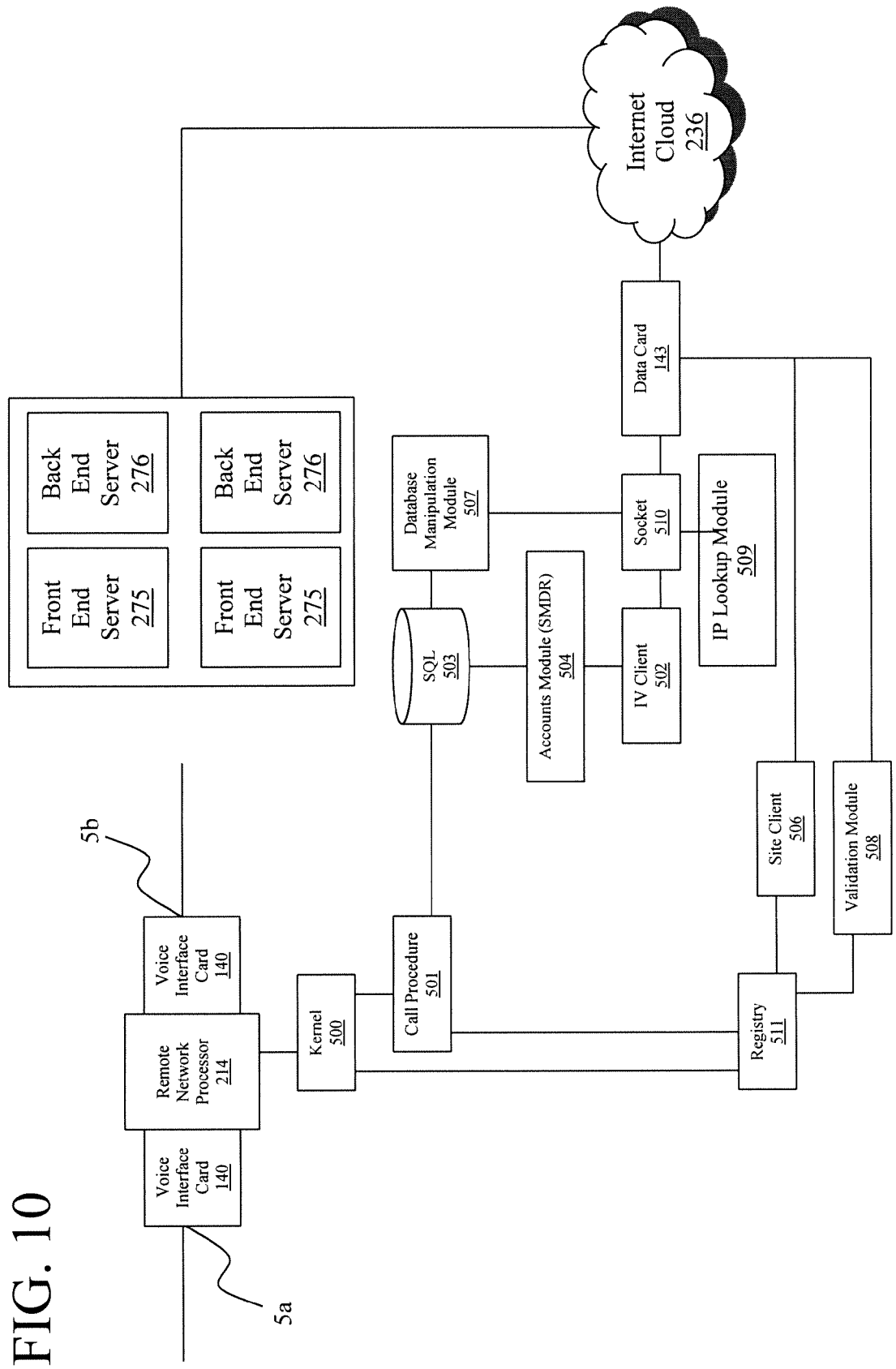
FIG. 10 shows a diagram of the function of the port allocation system at the remote network processor.

The ISP connects through a socket to an IP lookup module which gives current IP information to the servers and is also connected to the call procedure via the IV client module which provides the internet connection back to the servers. The IV client also connects to the SMPR manager which scans for records not sent through the servers and looks for CDR files on the local hard drive. The ISP are also connected directly to the BNA module which retrieves BNA to be placed with the call record. The SMBR manager, BNA module and call procedure kernel are all connected directly to the SQL. This may be shown graphically in FIG. 10.

Figure 2:
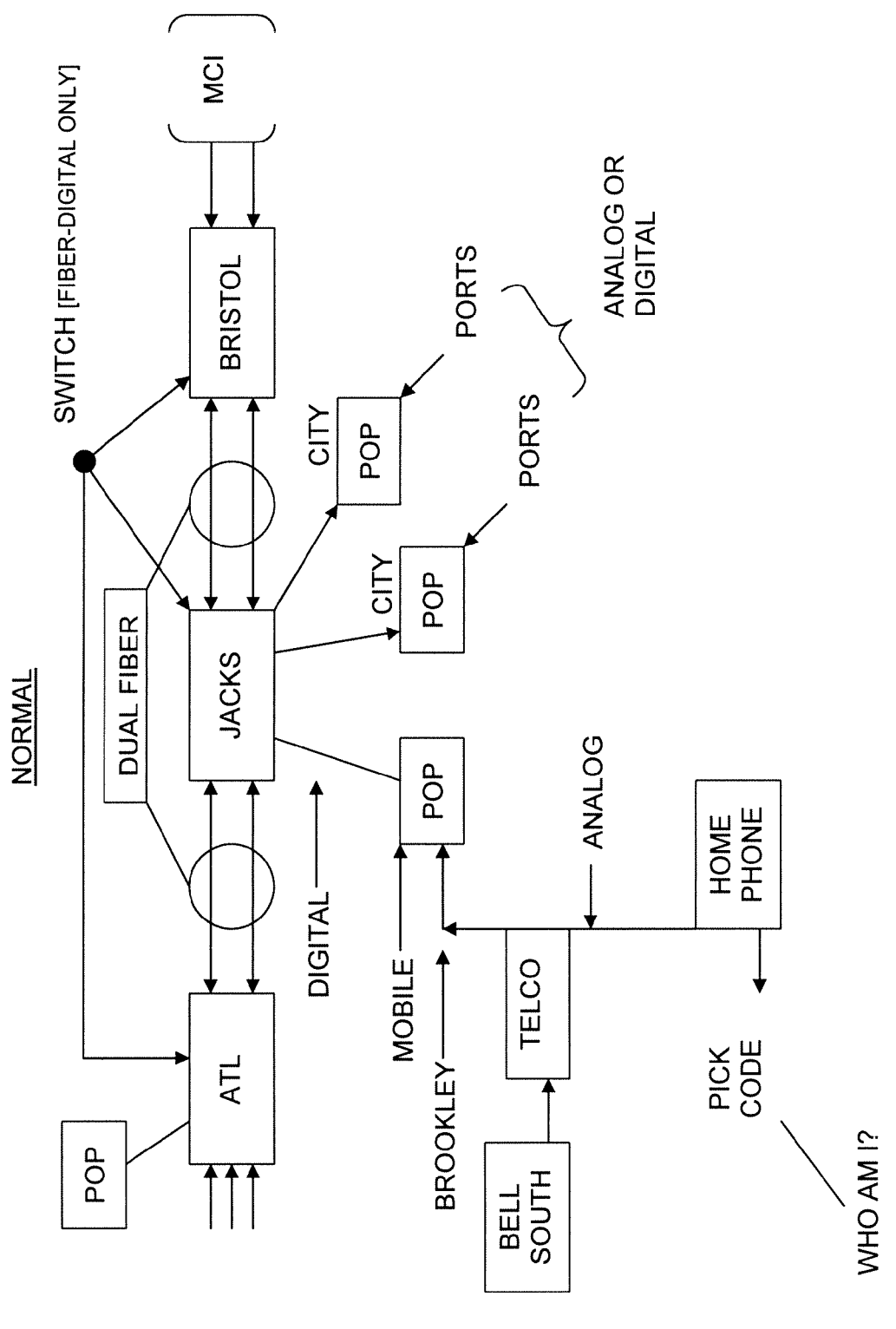
FIG. 2 shows a typical telephone switching fabric.

(1) The character module 500 (or character kernel), a software module, designates the personality of the port 5a in conjunction with the character quantum of the call which serves to switch the call to the remote network processor 214 through the long distance courier network (shown in FIG. 2). The character module controls the continued switching of the call, the recording of the call, processing prompts given to the user associated with the call, timers (associated with receiving information from a user) and certain lower level diagnostics based on information in the character quantum.

(2) The second software module is a call procedure module 501 which controls the communication between the character module, the database, and any other modules within the remote network processor which are affected by the character portion.

(3) The third software module is the network message handler module or IV module 502 which handles communication within a wide area network 236 (which could alternatively be a LAN) which is used to obtain information from clients. This information is used to process the phone calls and to may also serve to establish port protocols in conjunction with or in place of the ANI, DNIS information used by the character module. It validates the call using a LAN or WAN 236 comparisons through a database validation.

(4) The fourth software module is the storage module 503 (or BIGMIG) which handles file creation and the handling of files which are created from the information in the telephone call and includes sending the information to a database. This converts the recorded call to a storable and retrievable format with CRC information (encoding algorithms).

(5) The fifth software module is the accounts module (or SMDR) 504 which records transaction information and processes the billing information associated with the billing of the telephone call and the other resources utilized.

(6) The sixth module is the housekeeping module 505 which is a module for controlling the databases, accessing the databases, and doing other activities associated with the databases which are handled after a telephone call is completed or otherwise in a non real time environment. This module may delete calls after a time or move calls after a time.

(7) The seventh software module is the special site client module 506 which monitors all of the activities including providing error detection and an early warning system of information which is considered important to the controlling user of the entire architecture of the telephone call and functions to provide information in a real time environment or based on a historic review (at the user's election) of database activities for errors or key information notification.

Life counts are monitored as modules generate numbers and this module makes sure the number is changing. When a module of software stops working or responding and therefore stops sending life counts, it mails to the user an information alert identifying the module to be checked for performance.

(8) The eighth software module is a database manipulation module 507 which includes stored procedures for handling data.

(9) The ninth software module in the preferred embodiment, is a validation module 508 which controls the interface of the telephone system heretofore described with external data systems. This module works with the network message handler module.

Figure 6:
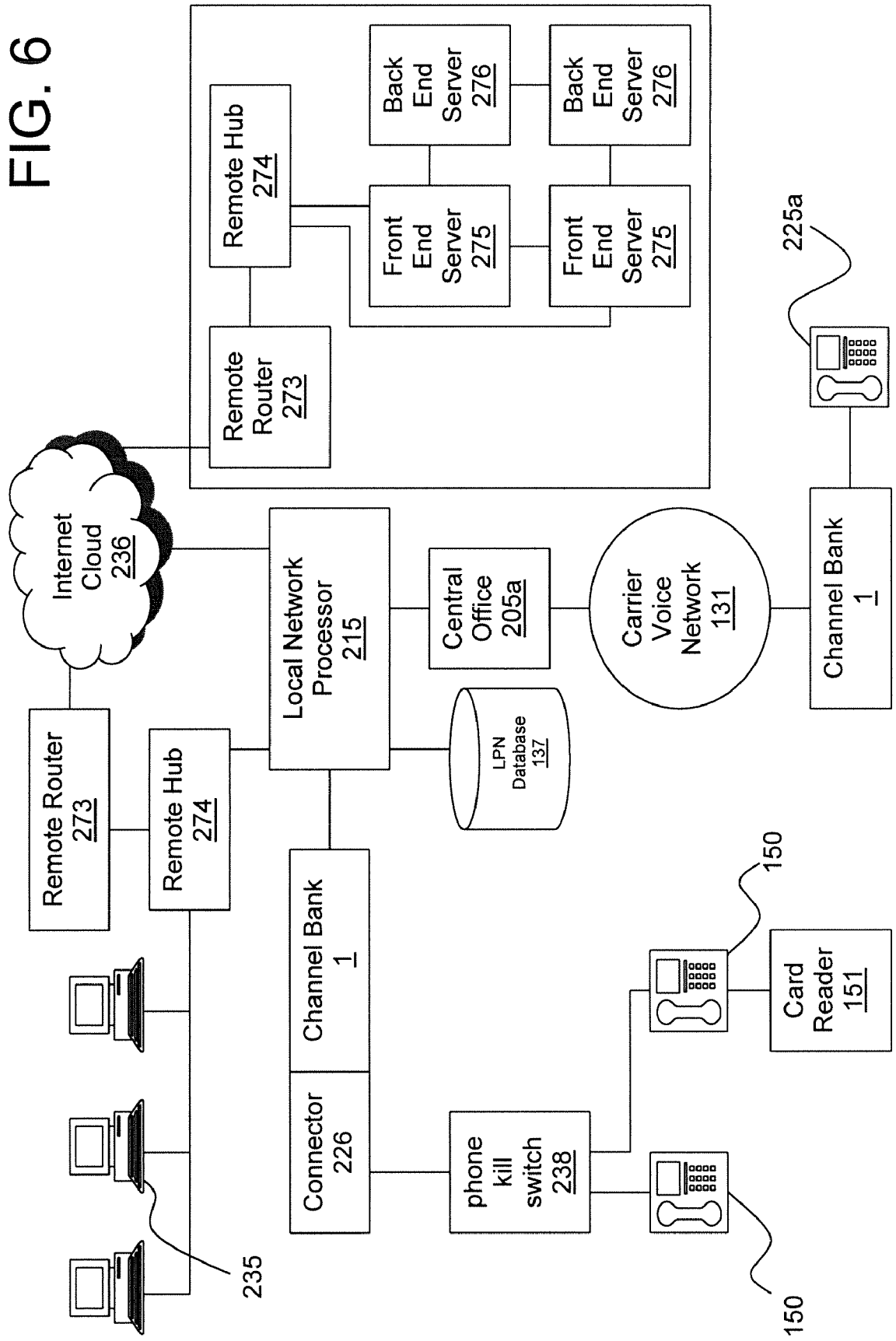
FIG. 6 shows how the system shown in FIG. 5 may interact with a remote network processor.

(10) A tenth module is the IP lookup module 509 which gives current IP to a group of servers 275 and 276 described in reference to FIG. 6.

Sockets 510 may be placed where necessary to connect software modules run with different hardware as shown with the connection of software resident on the RNP 214 to the data card 143. A registry 511 serves to smooth internal communications.

One example of port identification and port allocation involves the utilization of specialized telephone billing and control hardware. Input from the control hardware is through software and hardware interaction converted into character quantum. In the embodiment shown in FIG. 6 this would be generated from hardware GUI 331 for reading user data (e.g. a calling card reader or a fingerprint reader) and would include hardware and software for providing information to the user, whether through the handset 216 of the phone system or through a digital display or other graphic user interface (GUI 331) which is part of the phone system, or part of an external display unit which is connected to the phone system. This could include software which would prompt for the user for finger placement on a fingerprint reader and would interpret the information that was entered which might include an enrollment step. Keypad 217 may be used to receive information.

A software driven call setup module would add to the character quantum of the call information to identify the message type as being one associated with the particular hardware and user in question and this would be a part of the ANIS or DNIS of the call. (The finger print reader could easily be replaced input from a traditional touch tone telephone or a card reader)

The call setup module could query a remote or local database in order to do comparisons to a central database of user input data based on the user data. The remote database may be contacted via the internet or other local (LAN) or wide area network (WAN).

As can best be seen by reference back to FIG. 1, there are several phone systems. Here several different originating phones are shown although all of these phones work the same way. By way of example, there are client phones 225a, small business phones 225b, doctors appointment phones 225c, call center, here a series, hotel reservation system phones 225d site clerks phones 225e, campus phones 225f, residential phones 225g, hotel phones 225h, and prison phones 150 as examples. Examples of the types of phones which may interact with the system given above is in no means meant for anything other than illustration of the process. Some phones are connected to the central office 205a in the manner known in the prior art. Phones 225a, 225b, 225c, 225g, and 150 are connected to first central office 205a. Phones 225e, 225f, and 225h connect through second central office 205b, phones 225d connect through third central office 205c.

Figure 9:
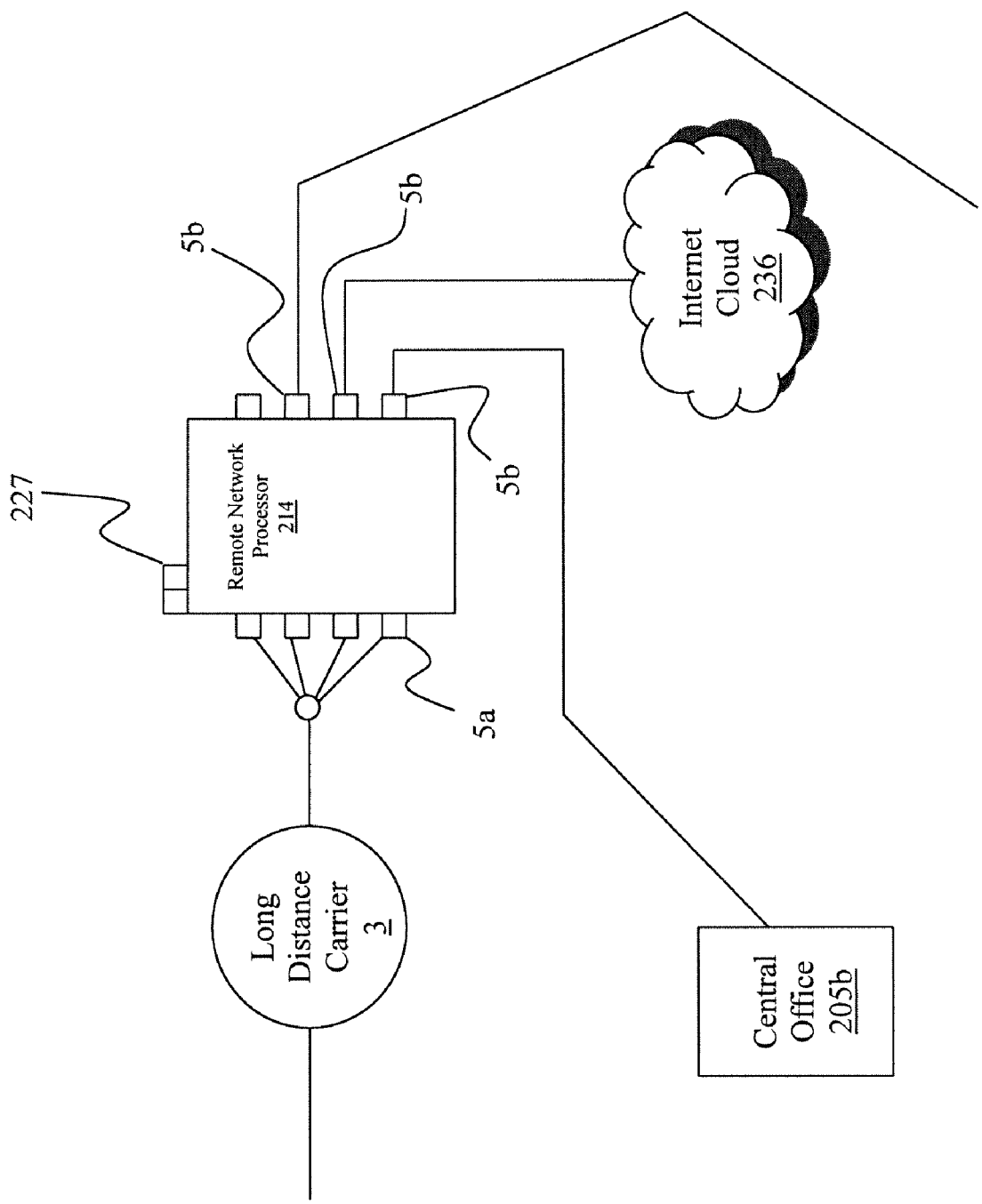
FIG. 9 shows a detail of the data ports of the remote network processor from FIG. 1.

Phones 150, by way of example, are attached via punch down blocks 226 to a solid state channel phone bank 1. A call is sent through one of several outgoing channel bank ports 230. The central office 205a, connects these phones 225a, 225b, 225c, 225g, and 150 to the long distance carrier network 3 which in turn carries the call through switches (shown in FIGS. 2 and 3) in the switching fabric from which the calls passes through a trunk in the fabric to one of a plurality of incoming ports 5a in the remote network processor 214 (FIG. 9).

In the case of the prison, when the dedicated telephone 150 is off hook (handset 216 is lifted—see FIG. 7 for detail of a phone), a signal is generated as which travels from telephone 150 through the punch down blocks 226 through the solid state channel bank 1 into the central office 205a.

The call center phones 225d connect to one or more on site punch down blocks 226 and then connect to a local network processor 206. A high capacity line 227 connected directly to the remote network processor 214 via WAN 223 may be used for verification of the call before connecting this call to the central office 205c. Low call volumes may pass directly through this high capacity line 227 to further reduce port usage.

Figure 7:
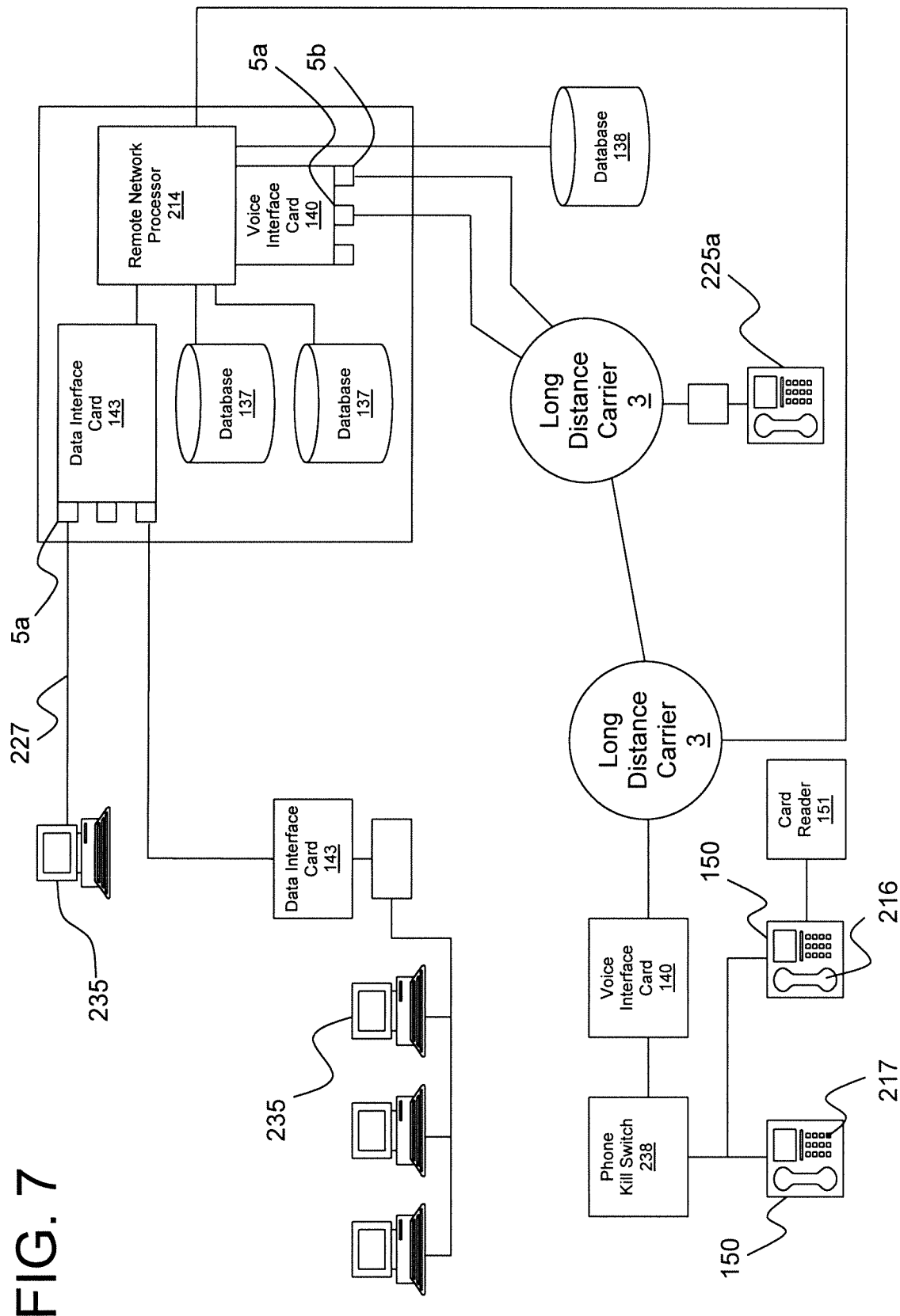
FIG. 7 shows an how the system in FIG. 6 can be modified to work without the local network processor.

This arrangement combines the local system shown in FIG. 6 with the remote system shown in FIG. 7, although preferably the LNP is replaced completely with the RNP.

The verified call is automatically switched by the first central office used to a desired long distance carrier network (FIGS. 2 and 3) and ultimately into an incoming port 5a in the Remote Network Processor 214. Alternatively, the call may go to a port 5a from the high capacity line 227 to a high capacity data card 143 in remote network processor 214 (see FIG. 7 for a detail of this). An internet connection may also be used for connecting certain calls and data between the local network processor (LNP) and remote network processor (RNP) 214 instead of the direct line 227 as described in FIG. 7.

The phone call signal typically starts as an analog signal but is converted before leaving the central office (or before reaching the central office) into a digital signal consisting of digitized data information. The digitized data information is attached to the telephone call generated at either the phone 150, the GUI 151, or the channel bank 1 or as part of the pic codes attached to calls at the central office 3.

In the case of non-dedicated phones, switching signals may be DNIS or ANI signals. In these cases, signals are examined by the central office and compared (by computers) to a database of similar signals in order to determine the type of call coming into the central system and to route the call. This may be done before or after the signal is converted to a more computer friendly digital format, although DNIS and ANI signals usually originate as digital signals.

An instructional data portion of the signal may be routed separately, by WAN, for example, in order to allow profiling of ports (5a) or to obtain routing information from the remote network processor 214 to direct the call to or away from the RNP 214. Data stored in the LNP database 137 (FIG. 6) may control this function. In some cases, these calls would then be routed directly through the central office. In the prison system, for example, certain phones (such as a warden's), might directly link to the outside, although this link might first be verified by the remote network processor 214.

As can best be seen by reference to FIG. 1, the invention comprises a plurality of client types, by example 225a through 225h and 150. For illustration purposes, these are at least one residential client 225a, one small business phone 225b, one doctor phone 225c, in this example used for appointments, one call center client 225d, one reservation oriented client having one site or off site clerk phones 225e (in this example a hotel), a campus oriented client 225f (in this example a college), residential phones 225a and hotel phone 225h, and at least one restricted campus having in this case, prison phones 150.

For smaller customers, the system described herein would have all of the information passed through the central office 205 in the manner described below.

For some large customers, the first step in a process would be for the telephone calls to go to a local network processor 206 (call center phones 225d) which would transfer the telephone call in the most efficient method determined by the LNP 206.

(1) First, some calls could be routed directly to a remote network processor 214 via a dedicated high capacity line 227. This could be a T-1 line, or a wide area network line (such as a isdn-PRI integrated service digital network, an S-Net-synchronized optical fiber network, or a Cable tv connection or other internet connection). This routing would allow for checking card readers or PIN data before the call was completed. This updated information could come back to the LNP 206 and attached to the call procedure quantum (CPQ) of the call before the call was sent to the central office 205a.

Figure 3:
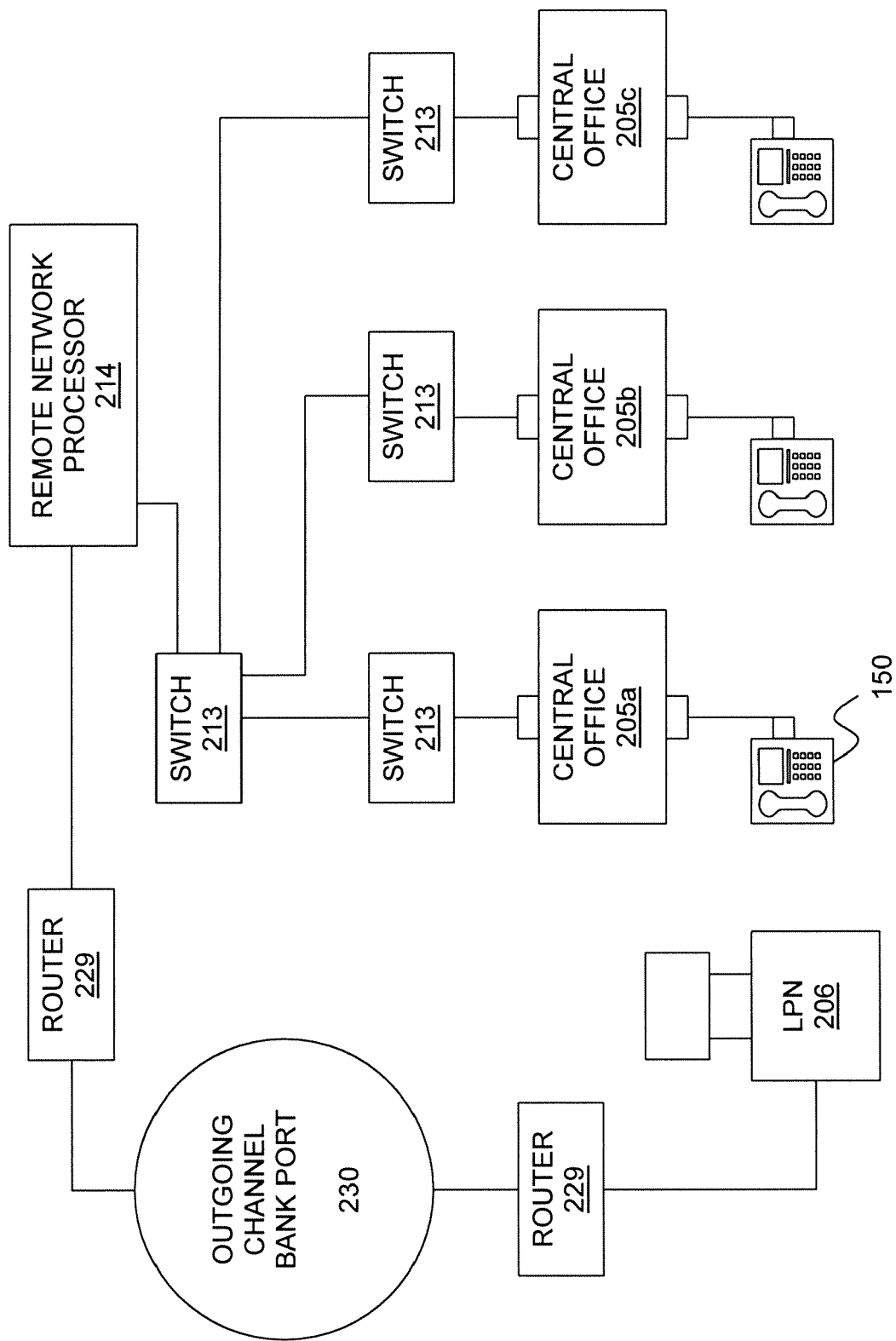
FIG. 3 shows a switching fabric of the type shown in FIG. 2 interfaced with a wide area network and a remote network processor.

A quantum of the call, being the CPQ of the call (as opposed to the content quantum), may be separated by the local network processor 206 or central office 205a so that the CPQ goes through a wide area network 228 comprised, in the example of FIG. 3, of at least one router 229 and a frame relay 230 to at least one second router 229 which in turn is directly connected to the remote network processor 214. This billing portion of the call would be maintained by the RNP 214.

While separable, the two quantum of the call (CPQ and content quantum) they may coexists at different locations of the call signal wave.

In FIG. 3, the call from the phone 150 goes through a central office 205a through switches 213 which are part of the phone system in the prior art to the remote network processor 214 which uses this information to send data to the LNP 206 or uses information from LNP 206 to determine forwarding requirements of the call. The call may be sent back through the switches 213 to other central offices 205b or 205c to complete the call.

In FIG. 1, the content quantum of the prison phone 150 call along with call procedure contained in the data quantum with which has the DNIS or other switching information goes through the telephone company central office 205a by way of the channel bank port 237 which is typically connected directly to a central office port 210 associated with a particular wire to the channel bank 1.

In some cases information, here the doctor's office phone 225c, such as patient names and telephone numbers, will be routed through the central office 205a to the remote network processor 214 and in other cases it will be routed through an Internet connection directly from a microprocessor 235. Here, in a doctor's office, through an Internet system or WAN cloud 236 in an Internet data port 5a in the remote network processor 214. As shown in FIG. 1, the doctor's computer 235 may also communicate through the internet cloud 236 to the RNP. The connection with the internet cloud may be the internet or a WAN private connection for privacy.

The economies of scale for the system are realized by having multiple users of different types or having different call formats controlled by a single remote network processor 214. By changing the personality imparted to the ports 5a and 5b by the remote network processor 214, a variety of different users may share a single hardware platform in a single group of ports 5a and 5b so that significant economies of scale can be realize. (See FIGS. 5 and 7)

In the doctors office 225c, there is a microprocessor computer 235 on which the physician keeps appointment medical records, dates and times.

Periodically, these appointments and dates and times may be sent out by the computer over the Internet to the remote network processor 214. Remote network processor 214 can take the data sent from the computer 235 at the doctors location 225c and activate one of the ports 5b in order to call out to customers of the doctor in order to eliminate the need to tie up one or more ports 237 at the doctor's office which are not centralized. These RNP ports 5b maybe used at specified times or only when the ports 5b are not otherwise required to maintain a minimum number free specified by time of day and the other users.

The call center 225d could provide instructions either through the local network processor 206 having high a density dedicated line 227 through a wide area network 228 or through the central office in order to give instructions which are stored at the remote network processor 214.

These instructions from the call center 225d are then stored in the form of a port control packet in the database 138 which is information setting a specific personality (questions and answers type of call, etc.) to a port 5a selected at random or using software as the first available port 5a or 5b by the remote network processor 214 when a call comes into the RNP 214 or goes out from the RNP 214 respectively. This port 5a may be further defined by the CPQ control procedure quantum of the incoming or outgoing call.

When a customer picks up a client phone 225a, which then runs through a central office 205c of the telephone company there would be no way for the central office 205a to know a particular routing for the call. In accordance with prior art, the first six numbers dialed direct the telephone company may alter the long distance carrier PIC code and instead attach a special CPQ. Once this special CPQ is attached to the call by the central office 205a, the call could be re-routed through the switching network to the remote network processor 214 as shown in FIG. 3.

If the call is to a call center, at this point the remote network processor 214 utilizing the information obtained from the call center 225d and/or the CPQ; sets the personality of the ports 5a to accept a call from a customer phone 226 and provides the appropriate information which might include data obtained from the call center 225d about the telephone number of the customer client phone 225a or the telephone number the call center called. The data may be delivered in real time, by a high density dedicated line 227, wide area network 228, (the Internet for example) or even through another phone line through the switching network to the call center. The call may even be routed to the correct part of the call center (e.g. an operator, specific phone extension, appliances vs housewares or emergency room vs patients information if a hospital).

No customer service individual at the call center 225d need be involved in the telephone conversation at this time since it is an automated process. Once a customer service individual is required, the remote network processor 214 opens an outgoing port 5b and the appropriate call center phone is called directly. This requires that the remote network processor 214 to redirect the customer call through the telephone switching network or through a high density dedicated line for a WAN or LAN. A call can continue to go through the remote network processor 214 thereby tying up two ports (5a and 5b) of the remote network processor 214. The telephone call may also be redirected along with information given by the user so that the call center phone 225d has all of the information which can be obtained from the customer via phone 225a prior to connecting the telephone call. The same central office may be used, and multiple different central offices may be used by different phones.

In another example, a hotel reservation system 225h is comprised of multiple hotels 225h1 through 225h2 in this example. There are multiple reservation clerks can be contacted on individual clerk phones 225h. These clerk phones 225h may be located at various locations at homes, or at hotels.

A customer contacts the phone service through a phone 225a which passes through central office 205. The remote network processor 214 selects from a group of personalities for the phones of the specific hotel reservation system in question. When the appropriate information is obtained, the telephone call is automatically queried and then routed to the first available or the most appropriate reservation clerk phone 225h. For example, the dialer may call for a New York hotel and the forwarding could go to clerks at a New York location.

In this case, when calls are going to the remote network processor 214, the CPQ of the call might include the originating number and whatever PIC codes or DNIS codes are appropriate to the call in order to allow the voice data to be appropriately associated with the CPQ at the remote network processor 214.

This allows the call center to decentralize their staff and to reduce the incoming ports and local network processors 206 to a single RNP 214 by processing a variety of calls through one remote network processor 214 located at a spur off of the telephone long distance network.

In most cases, as shown in FIG. 2, this long distance network is at least a dual ring fiber network (prior art) allowing that at least two lines are available in the event that one of the two lines is disrupted for any reason.

FIG. 1 also shows a campus system, which may be a college campus but could be any other collection of telephone systems. The campus system 225f has at least one local network processor 206 which serves to control calls both into the system and out of the system through what is typically a local network processor 206. This local network processor 206 may have a high density dedicated line 227 connecting it to the remote network processor 214 so the calls, or CPQ of calls, into or out of the campus 225f may be rerouted through the remote network processor 214 so that the telephone ports associated with the system are maximized and the workload of the local network processor 206 is minimized. Also this allows the CPQ of the call to be modified to select particular forwarding long distance billing, etc. to attach to the call.

In yet another example, a prison phone system with prison phones 150 is shown.

Figure 5:
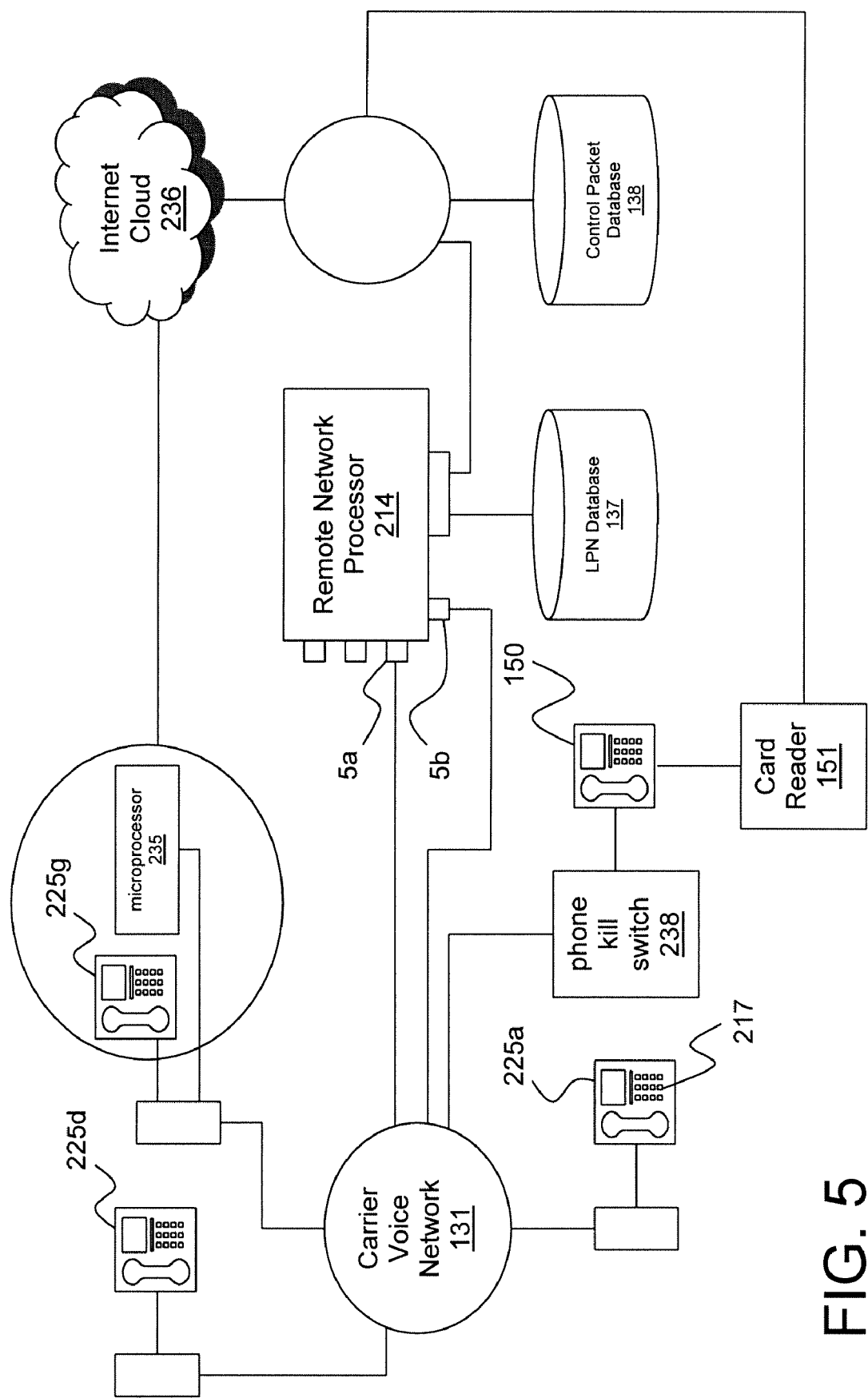
FIG. 5 shows an interaction of the voice and data portions of the call with a local network processor.

In this case, the data quantum of the telephone call may be made by way of a card reader 151 as shown in FIG. 5 (which could be used for a campus system or any other system wherein telephone calling cards are used which provide additional information on the user including DNIS or ring down codes) or it may be through a biological marker reading means.

The first six numbers dialed, the first part of the DNIS, attached to the phone during the ring down allows the local switch at the central office 205 to act as the point of presence and to forward the call by way of telephone system switches 213 to the remote network processor 214.

In the case of a prison type phone system or a campus phone system, typically the ring down is used. The ring down automatically includes information in the CPQ to tell the central office 205 the switching information to send the call to the remote network processor 214.

The phone bank 1 of the prison system historically comprised some sort of local network processor 206 which would serve to split the data portion of the call if necessary from the voice portion of the call and a dedicated line or wide area network would handle the data portion of the call which would include information which would be used by the remote network processor for determining the personality before processing the call and for handling the call through the remote network processor in the fashion described above.

The process described here allows the elimination of the LNP 206.

The CPQ for incoming calls from customers here 205b into the system could use the number of the customer as a part of the identifying mechanism of the call and would enter at the long distance carrier network 3. In the case of the prison system, the number called could also be an integral part of the CPQ since the number called could be relevant to the local network processor 206 or remote network processor 214 in determining the personality of the call and the port 5a and 5b in accordance with the disclosures set out above. When the DNIS shows the network 3 it is to a client, it is forwarded to the RNP 214.

In this case data is entered by the phone having a CPQ automatically attached as the DNIS.

As shown in FIG. 3, all of the ports of a client (phones, ports, LNP's, etc., may be referred to as a client system 50. In addition to the Internet cloud, a frame relay of dedicated bandwith such as a T-1 line generally comprises a high density dedicated line 227 may carry the data.

Once the call is determined to be routed out of a closed system, (client system 50), the remote network processor 214 automatically sends the call up through the first or most appropriate open port to the call center (205*a* here), to at least one first switch 213 where it is sent to either the second switch 213*b* or to an alternative switch 213*c* from which it is routed to a outbound central office (205*b* here) and into a remote telephone 225*i*, in this case, identified as a non-customer telephone 225 if parameters indicate the RNP 214 is to be avoided.

In this way, ports at the local network processor 206 are not tied up in processing the telephone call and the port efficiency can be increased dramatically, particularly where the dedicated bandwidth line between the local network processor 206.

Multiple data generation devices (here GUI readers 331) are not absolutely necessary to every embodiment of the invention. Alternating GUI's are finger print monitors, card identifiers, video cameras, speakers, etc.

In addition, the telephone may be generating device identification data at all times to the CBU of the RNP 214 for heartbeat and determining station location through the router 229.

When the information goes into the remote network processor, there are multiple high density T-1 interfaces which communicate with the Fiber hub which can go to a storage SQL2000 system, a validation server, a second validation server, a data warehouse, and either before or after speech recognition systems.

On this type of system, if required, all information (voice and DTMF) may be sent through one (1) second pair of wires referred to as the voice pair. On analog phones that this invention would be replacing, the 24-48 VDC twisted power pair 5 carries everything required to operate the analog phones installed.

There are two pairs required to operate the phone or electronically. Technically two requirements for functionality of the digital system include powering the system and providing communications. These functions are carried out using the same two pairs of wires previously discussed, but the communications are modified and organized as digital signals. For this phone, the power pairs of twisted wires are the same used for a standard analog phone supply 20-56VDC. This power pair is preferably analog power, 20-56VDC. Nothing else is communicated or transmitted via this first twisted pair in this embodiment.

The rules could use the DSIS or ANI information to make the determination, or various parameters associated with the data input itself.

One of the data inputs allows for fingerprint data (from reader 12) to be transmitted which prevents one user from utilizing fingerprint data of another user for an indefinite period of time.

The same would be true for credit card data which can be associated with video data so the credit card is being utilized by the appropriate person.

For purposes of this discussion, the credit card reader refers to any card reader for cards containing information required to transfer the data including PIN number data without actual charging data.

Function of the Remote Network Processor

Where the information originates with the phone, the local or remote network processor (depending on programming) will look up information associated with the signal (DNIS or ANIS) generated by the phone or other UID (user interface device) such as a card reader or finger print scanner 331 and then sends this information via wide area network or as a data portion of the telephone call through the central office (205*a*, *b* or *c*) to the incoming ports 5*a* in the remote network processor 214 where the character module in the remote network processor 214 intercepts the signal and sets the incoming port's settings to those associated with the type of call and UID.

With this information, the remote network processor 214 may prompt the operator of the phone 150 (the originating user) or the destination user (via outgoing ports 5*b*) at a destination phone 24 soliciting additional information about the call until all necessary data is collected to continue.

At this point in time a data center 25 may check the data from the call and RNP in real time or may pause the user(s) while the check is made in the background. Usually, part of the data check would involve queries to the users, but it may only involve ANIS and DNIS data or PIC codes associated with the call.

As the next step, a query may be sent to the line information data base (LIDB) to verify the destination number. This check may determine the class of service of the destination number, the billing entity for the number and other pertinent information which may be compared to another data base in order to determine significant parameters for the call such as class of service, billing requirements, length, recording information, etc.

Upon receiving the response to the query concerning the class of service, another database may be examined to determine whether or not the call should be approved for transmission from the number of origin or to the destination number. Destination number types and origin number types are established for different port personalities for the multiple different users according to the user defined specifications of the users. For example, a prison phone may not be allowed access to business phones or may be given access only to particular phone numbers or may go into a recording or live monitoring made if certain numbers are called or in response to certain inputs. One such input would be a response to a query. The call might query the called party or a monitoring third party with the following message "This call is from (name) prison in mate. Press one to accept this call. For the monitor, the choice might be the press one to have this call monitored, two to have it recorded, etc. The end users, whether a prison or otherwise, could modify the prompts and the protocols in accordance with rules for setting protocols established at the remote network processor.

The remote network processor 214 may send additional prompts to the initial user or to the end user as to why the call is being denied specifics about services or why it is being allowed to progress or request additional information to make this determination, if necessary, based on responses and databases comparisons.

Other examples of database comparisons are:

(1) PIN number invalid: message; re-enter PIN number or cancel call;

(2) All lines to dialed number are busy: wait or call back or see full menu or put on hold at RNP 214 until a line is open at the called user;

(3) A check to see if all items are valid and if so to allow the user to:
  (a) select from the following menu:
    (i) enter an extension number;
    (ii) transfer to customer service or other location;
    (iii) send to the operator;
    (iv) select area of interest; e.g.:
      (a) appliances;
      (b) furniture;
      (c) services.

Some issues the system may evaluate for selecting the outside line port include:
1. Location
2. Product Expertise
3. Service Expertise
4. Usage based on rotation or time spent, etc.

Some settings for the either the incoming port 5a or outside line port 5b include rate information, routing, data push, question and answer, databases, recordings, (warnings and notices) and the like. Just as the incoming port 5a is given a personality so the outside line port 5b is given a personality which may be the same or different.

The remote network processor 214 then looks for a free and most appropriate outside line port 5a and "dials" or digitally connects to the destination number. Once the destination number is answered, the system may provide certain prompts as determined previously, may provide warnings concerning recordation, source or otherwise and may wait for prompts in order to check approval of the call by DTMF or voice.

Once all the criteria from the destination number is received and any additional information required from the originating number is received, the called party and the calling party are conferenced together.

Conversations may be recorded and digitized during the call and, upon termination, the recording file may be closed and a file name assigned as discussed in more detail below.

The file (call data in real time or when stored) may be then passed to another computer at the central site to examine the file using voice or key word or digital signal recognition to determine whether key words or phrases were spoken or entered during the conversation. The call may be retained for verification, evidentiary and quality control purposes.

The number of incoming ports 5a and outgoing line ports 5b made available may be regulated based on a percentage usage of total ports and/or time left to complete automated outgoing calls. Personality of ports as incoming 5a or outgoing line 5b may also be modified. In some cases, added overflow ports 5b may be made available to make or process calls during peak times. Because the number of calls possible at once are limited by the total number of ports, a percentage may be in use at any one time with a minimum percent which are left open according to usage formulas.

Port usage may be determined for each user by separating call times which are also used for billing.

Key words and phrases, origin and destination information and GUI data may be designated with time and date information and a database can be maintained at the remote network processor. Redundancy is possible by updating and maintaining a mirror system on a different long distance spur.

The information about the call, the start time, origination number, destination number, and length for example, may be inserted into the data package which comprises the call and a call may then be compressed and encrypted and a security envelope applied which allows limited access to the call.

The call that is recorded may be passed to the central data warehouse for archive and retrieval.

In practice when a phone 150 goes off the hook anywhere there is a ring down which includes digits. A hotline is pointed to one place.

Other calls go out according to pic codes, DNIS and ANIS information (first data packets). In the case of MCI as the carrier, the telephone central office and then the MCI switching fabric sends the hot signal to one of a plurality of open digital channels. The digits precede any other information from the incoming call. These digits tell which phone is coming in and provide switching information. In one of the embodiments, the first data packet can point to a larger packet of information from a central database which the remote network processor 214 uses in order to assign various parameters to the port 5a and in order to handle forwarding the telephone call.

This additional information may direct call switching or may tell the main port how to handle the transaction through routing, voice prompts, etc. These digits may be ANI information, the account number identifier showing the origination phone, or the DNIS information which is telephone number dialed information service identifying the number called or card information (data from a UID—user input data).

Both the incoming ports and outgoing line ports remain the same and the port does not need re-routing but either the incoming port or outgoing line port has its parameters changed according to the programming of the RNP 214.

In one example the user logs in and the port adds the user's number to the port protocol. The user may log in or out over the WAN or Internet but while logged out will not receive a call from a port. This allows receivers to not get calls during dinner or breaks, for example.

The invention may be defined as a system for allocation of telephone calls to restricted capacity lines comprising the steps of:
1. Selecting a plurality of lines having alternative characteristics;
2. Attaching at least one first call type of a plurality of call types to a telephone service cloud through a telephone central office line dedicated to the phone for an originating call.
3. Connecting multiple ports to the telephone cloud.
4. Determining the call types by identifying the particular character assigned to the at least one first call type with a user interface device originating the connection or the user interface device allowing for the interface of the originating call to a destination character line.

The method of allocating telephone calls to restricted capacity lines may be further defined as comprising the steps of:
1. Creating automatically or manually a first quantum of electronic information (FQEI) comprised of at least one switching information, call data information and call message information wherein the FQEI includes ANI or DNIS information as well as other pertinent data from the GUI for the phone originating the call.

This First Quantum may include:
i) originating phone data PI with the phone 150;
   usually ANI P2;
ii) originating reader data P3 with a reader means such as a GUI 331 card reader, other graphic user interface or biological marker interface (such as a finger print reader or optic reader);
iii) using dialed number data, DNIS P4, from the phone call user;
iv) using originating prompt data p6 from prompts given by the initiating users and destination prompt data p9 from receiving users and oversight prompt data p10 from a monitoring user;
v) using voice recognition data p5 derived from the users;
   A) identifying the individual in the conversation;
   B) identifying key words in the conversation;
vi) (a local network processor) using local network data p7; and
vii) using central office data p8 associated with the call at a central office, particularly PIC codes which directed switching of the call through the central office.

2. This method typically includes the steps of:
   a. opening the telephone record;
   b. digitizing the telephone record; and,
   c. closing the telephone record (upon finishing the call).
2. The method may include recording which may include steps of
   a) identifying recording information,
   b) sending and receiving prompts,
   c) associating the call with timers,
   d) monitoring the call with low level diagnostic information;
   e) monitoring the call with voice recognition software,
   f) recording the call;
   g) identifying the users:
   h) identify key words or phrases within the recorded call;
   i) naming the recording; and
   j) protecting the call with SQL database information;
   k) storing the recording (SQL database information).
3. The method of recording may include the steps of identifying the recording with certain markers including the start time, origination number, the destination number, the P.I. N. number and any other code or number identifying the users; compressing the recording, encrypting the recording and providing a security envelope around the recording.
4. The method may comprise steps of creating automatically or manually a Second Quantum of Electronic information comprised of user or customer profile information.
5. The method may further comprise the step of creating automatically or manually a third quantum of information for cross communication controls and providing directions in the First Quantum.
6. To allow this to be practiced and recognizing the economies of scale associated with centralized port sharing, the method of allocating phone calls to restricted capacity lines may comprise the steps of:
   a. Setting up a plurality of initiating telephones 150;
   b. Providing at least one network switching means 26 to connect the telephones 150 to a plurality of incoming port 5a of a remote network processor 214;
   c. determining at the remote network processor 214 the characteristics associated with calls from the initiating telephones 150 which may include the steps of:
      i. identifying the origin, the dialed number, or both;
      ii. Providing a plurality of rules to determine the type of routing associated with a incoming signal including monitoring, recording, (data push movement of the data from one location to another).
   d. Providing a plurality of protocols (comprised of instructions for handling calls and port settings) associated with different types of phone calls;
   e. Providing a connection between the incoming ports 5a and outgoing port 5b matching; and
   f. The selected protocol from the plurality of protocols;

The method may include the steps of obtaining additional information via voice prompts, data pull-push (sending pulsed data or quantified data), switching methodology, voice recognition, record production, and recording.

The method allows that when the phone comes off the hook there is a ring down which is a preset hot-line type connection between the phone 150 and the pbx application directing the call to the remote network processor 214. This ring down occurs by entering electronic digits into the call quantum in the form of automatic or manual inputs; identifying a "hotline", utilizing switching fabric to create open digital channels; proceeding the input of information with incoming phone with digits identifying the phone source; the port parameters; or a group of parameters including reading information, routing, voice parameters, ANI (Account Number Identifier—which phone is used); or DNIS (Dialed Number Information Service—what phone is called).

A transaction protocol at the remote location would create a billing record associated with any particular call which would be associated with the character portion and initiating call procedure.

Because a particular call procedure is associated at the remote location with a particular call procedure quantum, the same port can be utilized for a variety of call quanta drawing on a variety of different call's corresponding call procedures associated with the call quanta so that the number of ports can be minimized while allowing for a maximum number of different call procedures and call protocols.

Looking at FIG. 4, it can be seen that the call procedure quantum changes or evolves as it is processed. At the first stage the call has a first call procedure quantum (CPQ) generated by the phone and any GUI, LPN or RNP adding data. At the central office a second CPQ may be created using PIC codes and other central office 205a, b or c generated information including information to the CO from the RNP 214. After passing from the network cloud to the spur to the incoming port, the RNP 214 gives incoming port 5a a personality and where required gives outgoing port 5b a personality and generates a third CPQ for the outgoing call. The procedures and even the CPQ's can be changed as the call is processed at the RNP 214.

The behaviors of the ports 5a and 5b are modified according to the origin of the transaction and other information contained in the CPQ and subsequent CPQs and WAN information, if any, coming in to the RNP 214.

Referring to FIG. 5 it can be seen that the system centers on the remote network processor ports 5a which communicate through the carriers voice network 131 which is shown in Detail in FIGS. 2 and 3. This is connected both to users phones represented here by client phones 225a and prison phone 150 as well as call centers and businesses, here represented by call center phone 225d and small business 225b. Input may be made by the user via the handset of the phone 225a or via the keypad 217.

In addition, the remote network processor communicates with internal data base and external data base which are utilized in order to run the system.

The carrier network delivers a digital voice call with either DNIS or ANI information. The remote network process or 214 interprets this proceeding data to provide any incoming port 5a with specific personalities associated with the type of call. The port personality is dynamically changed for each incoming call and is therefore not port specific but data specific. This works with either straight data or with voice data. Straight data calls are IP based information would come in through a data network and in some cases the voice network and the data network would work together as described above.

Port personality includes everything the system needs including a voice prompts, data pull/push methods (the movement of the data), switching information, voice recognition, record production, and recording.

Referring to FIG. 6 it can be seen that station phones 150 run through phone kill-switches 238 and to punch down block 226 and then to a local network processor 215. The local network processor 215 splits the call into a data portion which goes through hub 274 connecting computers 235 with router 273, through a wan 236 (or a LAN, if desired) and into a remote router 273 connecting at a remote hub 274 to front end servers 275 which back up into back end servers 276. The call portion of the call goes through a first central office 205a as the initial point of presence into a voice network (as shown in FIGS. 2 and 3) and then into a channel bank 1 to a destination called client phone 225*a*.

The entire call may be stored in a data array, here database 137.

In one version, a high capacity T-1 voice line 241 which goes into a digital service cloud (here wan 236) which may go through PCI ports at a central office which then send the calls to the off site servers (275 and 276) either for validation or into a storage system at the remote location as discussed more in reference to FIG. 7.

In the embodiment shown in FIG. 7, the a remote network processor 214 is simultaneously connected to a data network 236 and a voice network 3. These come in through digital voice interface cards 140 and data interface cards 143. Both cards 140 and 143 are in turn, connected to the remote network processor 214.

The originating or source telephones, here prison phones 150 go through voice interface cards 140 (typically pika pots or T1 cards). The phone lines or API lines typical to a home connect these ultimately to the cards 140 at the RNP 214.

FIG. 7 shows how the incoming ports 5*a* and outgoing ports 5*b* could be off of the same card 140.

Figure 8:
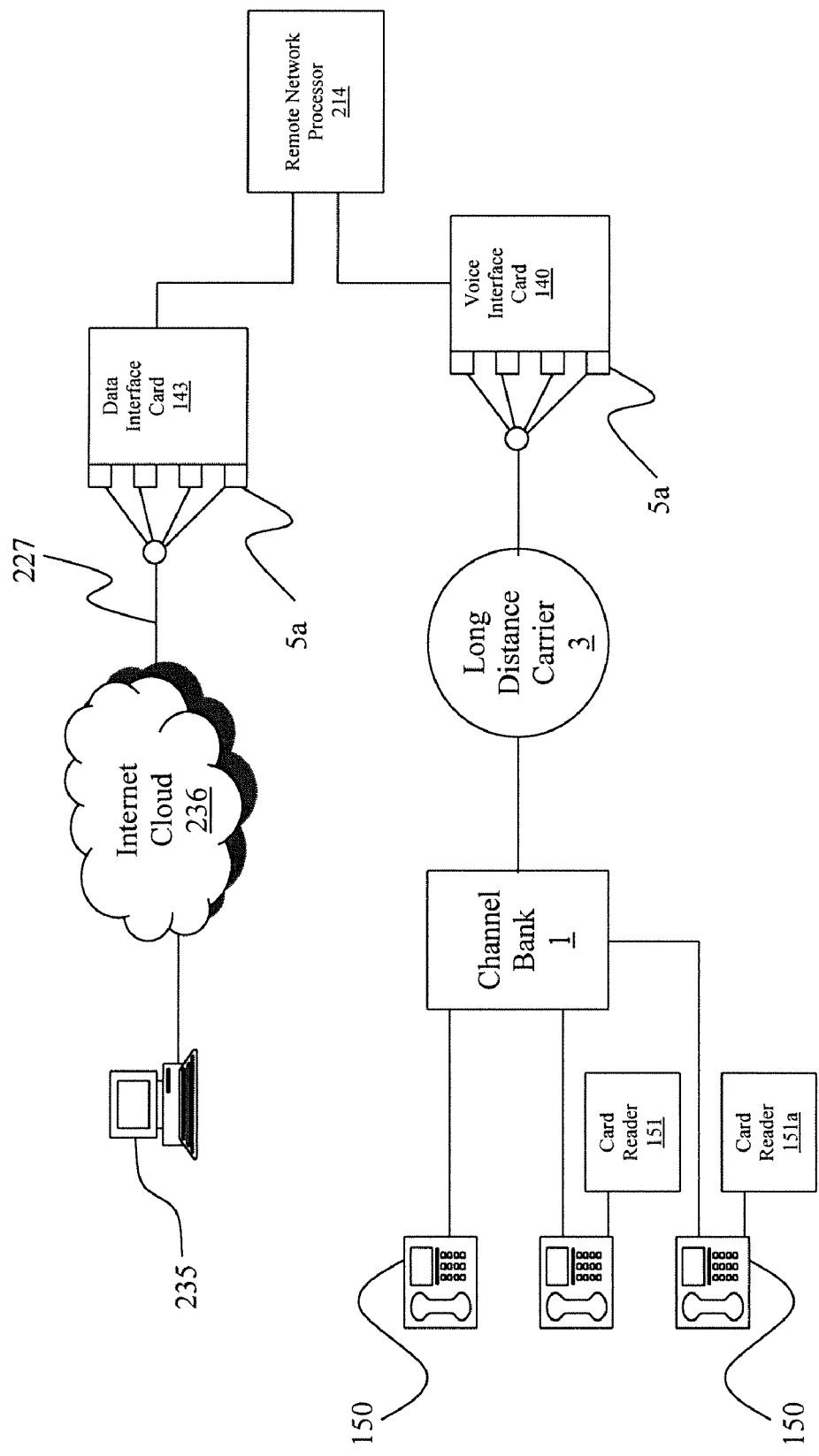
FIG. 8 shows how data and voice may be combined at the remote network processor.

FIG. 8 shows how with this arrangement may be modified with data from GUI 151 or from GUI 151*a*. The difference between these two devices, typically fingerprint or card readers, is that 151 feeds the information to the phone call directly and 151*a* goes through a computer 235 which forwards the information directly to the RNP 214.

At the RNP 214, the first kernel or software module examines the information coming in at the port which controls voice cards, looks for the hook condition, controls voice prompts, processes DTMF information, controls dialing out on a trunk line, selects the type of call, selects the language associated with the type of call, identifies and controls the PIN number (where a reader 151 is used), handles live monitoring, etc. For example, in one mode, the first kernel would verifies the PIN to name access, speed dials number or handles speed dialing functions, activates channels (guard check in), gives a static of dynamic ratings for the line, generates diagnostic reports, creates local CDR files in the event of a SMDR failure and in turn is connected to a second API line which turn takes the call outward to the telephone company via cloud 131 where it is finally routed to a call party, here client phone 225*a*.

The controlling software for the port (at the remote network processor 214) which port is card 140 is connected directly to the call procedure module which contains validation logic, SQL access for the kernel (controlling the port), processes call control, delivers validation request to IV client, takes SNDL from the kernel and places it in a SQL, processes hooks, local STDL validation, contains recording logic and alert logic in order to notify certain circumstances.

This call procedure module as well as the call procedure module are connected through the API to the NT registry on the controller which in turn is connected through API to a REQ module that speeds up remote access of the registry and writes registry to SQL for call search and can back up the registry to files when required. The NT registry also connected to the site client which keeps the clock on, controller correct, and also monitors the heart beat of the system and sends the status to a monitoring system so that problems with the systems are noted.

This is connected to through a socket and series with the REG module and that the site client module so described is contracted through a socketing series with a socket connection and the REG module through the ISP router which is connected through the Internet or a frame (WAN) to the servers.

This communication from the ISP to the servers is controlled by the IAS assistant which maintains the connection.

The ISP is via through a socket to an IP lookup module which gives current IP information to the servers and is also connected to the call procedure via the IV client which provides the Internet connection back to the servers. The IV client also connects to the SMPR manager which scans for records not sent through the servers and looks for CDR files on the local hard drive. The ISP are also connected directly to the BNA which retrieves BNA to be placed with the call record. The SMBR manager, BNA and call procedure manual are all connected directly to the SQL.

Since all of these activities occur at the RNP 214, substantial savings of port usage and hardware, as shown by a comparison of FIGS. 6 and 7 is recognized.

This shows how the work stations (item 235) may be web based and located at any desired location or locations allowing for enhanced home use or division of labor between agencies or branches of agencies.

While there is a single card 140 is shown, there may be multiple and redundant high density T-1 interfaces. There may be speech recognition protocols. The validation server may be separate.

FIG. 6 and FIG. 8 can be compared to see how local phones are empowered without having expensive Local Network Processors. In both cases, the phone communicates via the digital data line formed by the voice pair 4 (2-5VDC wire pair).

With a Local Network Processor, it may have on site control of GUI devices 151. These may be controlled remotely as with 151 which communicates with the RNP 214 via computer 235 (which computer may be built into or be a part of the GUI 151).

Either or both a RNP and LNP may have storage with hard drives and RAM as known in the prior art. Different storage types would be more useful at different locations. For example short term RAM storage may be more useful at the phone where only short term storage is required. The Computer system would have both RAM and hard drive storage.

The computer 235 shown in FIG. 8 may be at any location. Here it is shown connected to a GUI 151 and phone 150 directly, but this direct connection is unnecessary as shown by reference to GUI 151*a*.

A user would operate this computer 235 which can be used to monitor calls through the connection with the RNP 214. The user of computer 235 may modify port personalities, override defaults, monitor calls and take other actions including recording or terminating calls.

Further explained, the user may want one piece of data over the other or even to halt voice to receive other data if required or requested. In this way, computer 235 can become a monitoring station to monitor the telephone call for several different purposes. It may be a third party to whom the other two parties look for quality control, it could be a monitoring company which maintains security over the lines, it may be for purposes of police surveillance, or it may be used for other services.

For example, in one embodiment the technology utilized herein would allow an employer to monitor, at a remote location, internet access and in another embodiment, it would allow a police officer to monitor activity associated with a telephone call and identification procedures associated with the telephone call from a prison telephone using a remote network processor 214 programmed to designate incoming and outgoing port and allowing this information to be duplicated for monitoring and recording purposes.

The steps of this process are:
1) determining the types of data desired to create a data group from the group consisting of voice, picture, bio-marker (finger print, retinal scan, etc.), card holder information (credit card number, etc.), DNIS and ANI call data, etc;
2) writing a protocol to prioritize the data types;
3) adding a reader to receive the data;
4) compiling the information from the readers
5) converting the data to a digitized forms corresponding to the efficiency determined by having wave type data converted into digital signals which are given a services of values (0 or 1) as a bit;
6) Splitting or copying the data to allow remote or on site monitoring; and
7) storing data which is not ready to send or after it is sent automatically or at the direction of the monitor temporarily or permanently.

Dynamic Port Allocation

Port allocation has several steps.

First, at least one type of protocol is determined. Preferably there are multiple communication protocols, but in the case of phone systems, a single communication protocol may be used.

Next, a plurality of call protocols are determined. These protocols include databases which include queries and responses to queries. Protocols may include interpretation modules. They also include forwarding and recording protocols.

Since these functions are centralized, substantial savings for this type of equipment are saved for end users.

In the case of a store with multiple phones, when someone calls for a specific purpose, the RNP 214 accepts the call and handles the forwarding information to a particular user or a particular store location leaving the ports at the store free until the information relative to forwarding of the call to the specific phone in question through a specific punch down block is determined. No equipment other than the punch down block and phone is required at the store itself.

The phones or computers at the store may access information stored at the central location (at the RNP or where ever the databases are otherwise maintained) for purposes of retrieving telephone call information recorded by the RNP 214.

The centralized system, using the phone data related to the call and associated by databases maintained by the RNP 214 is able to service as many stores or unrelated businesses as it has ports. The need for additional ports, answering systems, storage and switching systems at the stores (or other businesses) is eliminated since these activities, are centralized. Because there is access via multiple different mechanisms (phones, computers, etc.) there is full access to the phone system from each store as long as lines (phone, internet, LAN, WAN) of communication remain available between the stores (or other businesses) and the RNP 214.

There are multiple coded levels of access to prevent outsiders from infiltrating the information of a particular store when accessing the RNP. A separate access system may be utilized to prevent potential problems with the original incoming data, but the users should have access to the protocol databases since these will change every time the store changes it's protocols for answering phone (as when phone stations in the store are moved, areas (clothing, appliances for e.g) are added or special messages (sales, advertising etc) are required as part of the protocol.

The multiple protocols allow for this information to be supplied in multimedia formats (via phone, computer, and other digital feeds from the user to the RNP 214).

Referring to 131, it can be seen that the system centers on the remote network processor ports which communicate through the carriers voice network 131. This is connected both to users phones represented here by cel-phones and home phones as well as call centers and businesses. In addition, the remote network processor communicates with internal data and external data which are utilized in order to run the system.

The carrier network delivers a digital voice call with either DNIS or ANI information. The remote network process interprets this proceeding data to provide any incoming port with specific personalities associated with the type of call. The port personality is dynamically changed for each incoming call and is therefore not port specific but data specific. This works with either straight data or with voice data. Straight data calls are IP based information would come in through a data network and in some cases the voice network and the data network would work together.

Port personality includes everything the system needs including a voice pumps, data pull/push methods (the movement of the data), switching information, voice recognition, record production, and recording.

This can be seen the remote network processor is simultaneously connected to a data network card 143 and a voice network card 140. These come in through digital voice interface cards 140 which may have 96 ports 5*a* in the preferred embodiment and to data cards 143 having 96 ports 5*b* which in turn are connected to the remote network processor.

Referring to FIG. 7 it can be seen that station phones 150 run through phone kill switches 238 and to punch down block into a channel bank into a T-1 voice line which goes into a digital service cloud 3 which in turn goes into a plurality of compact PCI incoming ports 5*a*.

at a central office 202 which then send the calls into a switching hub 199 which sends those either for validation 197 or into a storage system 201 under design.

Referring to FIGS. 1 and 4, and using one of the telephones selected at random as a point of reference, in this case phone 225*g*, the phone is lifted and there is a switch to a long distance carrier. This switch may be made by associating correct routing information including DNIS or ANIN information. The next step is that the routing information is attached to the call either with or in front of the data. It may be repeated as necessary in order to ensure that the data remains with the routing information.

Next, the next step is switching the call to the routing fabric at the receiving port at the remote network processor which is preferably done by sending a call first through the local call office 205*c* and then on to the remote network processor through whatever switches are required.

Next a validation module and controlled kernel accepts the routing information and does several things. The control kernel, or control module, handles port identification, port control, it determines pipe cards conditions and does control voice box and DTMF processing. It also can handle dialing out after setting the port identification of a corresponding outgoing port.

It handles call types selection, language selection, PIN and UIT check, live record monitoring control, guard registration modes, name verification access, speed dialing, channel activation, guard check in, static or dynamic rating and diagnostics.

A validation module handles the call procedure module which handles the call outside of the port designation.

There is an accounts module in this for doing funding, house keeping modules, special client modules, database manipulation modules, storage modules handling databases which are local (internal databases), remote (external databases) which store questions and data electronically, and other queries the system needs to operate; it handles storage and then there are working active access modules which can be accessed locally or from remote locations in order to review prior recorded information.

Because this is handled within the system, the multiple users having multiple different port types, it is possible utilizing this system to eliminate hardware at multiple sites so that only a single side off the single trunk of a long distance carrier is necessary for the multiple sites.

Now there is also database manipulation modules for getting into the data.

The validation logic run by the call procedure includes SQL access for the kernel; process call control; delivery validation; requests to IV client; take SMDR from kernel; put in SQL; process hooks; local STBL validation and recording logic and alert logic.

There is also a network handler module which controls the operation of local area networks and wide area networks utilizing this system.

Part of the port identification, port control includes querying the origination, destination, and internal and external databases to the extent that they are accessed through a port.

Because many varying and different embodiments may be made within the scope of the inventive concept herein taught and because many modifications may be made in the embodiment(s) herein detailed in accordance with the descriptive requirements of the law, it is to be understood that the details herein are to be interpreted as illustrative and not in a limiting sense.

We claim:

1. A method for operating a telephone network to provide multiple communication protocols for handling communications between an originating phone and a destination phone connected through the telephone network in conjunction with a data network utilizing a plurality of incoming and outgoing ports in communication with and controlled by a remote network processor (RNP), comprising:
   providing a plurality of protocols applicable to the incoming and outgoing ports;
   creating a protocol database in a database accessed by the RNP;
   selecting a protocol for at least one incoming port;
   accepting a call from the originating phone on the at least one incoming port;
   determining if the call is to be completed;
   setting parameters for completing the call;
   selecting a protocol for at least one outgoing port; and
   connecting the incoming port to the outgoing port.

2. The method of claim 1, wherein completing the call is performed by sending the call through the telephone network.

3. The method of claim 2, wherein completing the call further comprises digitizing the telephone call and forwarding a copy thereof for monitoring to a monitoring phone.

4. The method of claim 1, wherein selecting a protocol further comprises:
   generating queries and answers and protocols associated with the answers;
   selecting appropriate queries based on data from the call;
   accepting user responses to queries; and
   designating the protocol of the port based on comparison of the responses to the answers.

5. The method of claim 1, wherein the call includes ANI data and wherein selecting the protocol comprises determining the protocol appropriate based on the ANI data.

6. The method of claim 1, wherein the call includes DNIS data and wherein selecting the protocol comprises determining the protocol appropriate based on the DNIS data in the call.

7. The method of claim 1, wherein the call is comprised of data and message content and wherein the protocol is determined based on the data portion of the call.

8. The method of claim 7, wherein the data portion of the call is sent to the remote network processor by a WAN and wherein the protocol is selected on the basis of the data portion of the call.

9. The method of claim 3, further comprising recording the telephone call.

10. The method of claim 9, further comprising:
    selecting keywords and phrases;
    monitoring the call with voice recognition software to identify the key words or phrases within the recorded call; and
    alerting the monitor of the keywords and phrases.

11. The method of claim 10, further comprising:
    generating digitally a recorded record of the call;
    marking the keywords and phrases in the call; and
    submitting the recorded record of the call to the monitoring user.

12. The method of claim 7, further comprising:
    providing a reading means for obtaining user information;
    adding the user information to the call through the data or voice portion of the call; and
    setting the protocol based on the user information.

13. The method of claim 12, wherein the reading means is selected from the group consisting of card readers, credit card readers, biological marker readers, finger print readers, optics readers, and pin readers.

14. The method of claim 7, wherein the data portion of the call is comprised of call data of at least one of the group consisting of switching information, call data information and call message information, ANI information, DNIS information and user data and wherein the protocol is set based on the call data plus the port usage at the time the call is made.

15. The method of claim 4, further comprising creating a billing record associated with the call.

16. The method of claim 12, further comprising creating at least one user profile associated with the user from a local network processor of a user and from data from the originating call and from a comparison of data from the call.

17. The method of claim 16, further comprising:
    adding the user profile to the protocol database; and
    setting future profiles based on the altered protocol database.

18. The method of claim 1, wherein creating a protocol database comprises setting parameters for protocols and allowing at least one user to define at least one group of protocols within the parameters.

19. The method of claim 9, wherein recording comprises:
    identifying the recording with markers including the start time, origination number, the destination number, and a user identifier;
    compressing the recording;
    encrypting the recording; and
    providing a security envelope around the recording.

20. A method for operating a telephone network in communication with a remote network processor, comprising:

providing a plurality of originating telephones;
providing a plurality of receiving telephones;
providing at least one network switching means to connect the originating and receiving telephones to a plurality of incoming ports of a remote network processor;
determining at the remote network processor the characteristics associated with calls from the originating telephones by:
    setting a plurality of rules to determine the type of routing associated with an incoming signal including monitoring and recording;
    providing a plurality of protocols comprised of instructions for handling calls and port settings associated with different types of phone calls;
    setting the protocol of an incoming port at the remote network processor based on the instructions;
    setting the protocol of at least one outgoing port at the remote network processor based on the instructions; and
connecting the incoming ports and the at least one outgoing port.

* * * * *